United States Patent
Mazzarolo et al.

(10) Patent No.: US 12,108,816 B2
(45) Date of Patent: Oct. 8, 2024

(54) WEARABLE PROTECTION DEVICE

(71) Applicant: ALPINESTARS RESEARCH S.P.A., Maser (IT)

(72) Inventors: Giovanni Mazzarolo, Treviso (IT); Lorenzo Nardo, Treviso (IT)

(73) Assignee: ALPINESTARS RESEARCH S.P.A., Maser (IT)

( * ) Notice: Subject to any disclaimer, the term of this patent is extended or adjusted under 35 U.S.C. 154(b) by 94 days.

(21) Appl. No.: 17/773,515

(22) PCT Filed: Oct. 30, 2020

(86) PCT No.: PCT/EP2020/080569
§ 371 (c)(1),
(2) Date: Apr. 29, 2022

(87) PCT Pub. No.: WO2021/089439
PCT Pub. Date: May 14, 2021

(65) Prior Publication Data
US 2022/0361599 A1 Nov. 17, 2022

(30) Foreign Application Priority Data
Nov. 4, 2019 (IT) .................. 102019000020298

(51) Int. Cl.
*A41D 13/018* (2006.01)
*A41D 13/05* (2006.01)
*B60R 21/01* (2006.01)

(52) U.S. Cl.
CPC ....... *A41D 13/018* (2013.01); *A41D 13/0518* (2013.01); *B60R 2021/01122* (2013.01)

(58) Field of Classification Search
CPC .............. A41D 13/018; A41D 13/0125; A42B 3/0486; B60R 2021/01122; B60R 2021/01184
See application file for complete search history.

(56) References Cited

U.S. PATENT DOCUMENTS

| | | |
|---|---|---|
| 4,161,797 A | 7/1979 | Ruscigno |
| 9,928,386 B1 * | 3/2018 | Gardner .................. G06F 21/88 |

(Continued)

FOREIGN PATENT DOCUMENTS

| | | | | |
|---|---|---|---|---|
| FR | 3031908 A1 * | 7/2016 | .............. | A63C 9/00 |
| WO | WO-2018206804 A1 * | 11/2018 | | |
| WO | WO-2020149785 A1 * | 7/2020 | ........... | A41D 13/018 |

OTHER PUBLICATIONS

PCT International Search Report and Written Opinion dated Mar. 12, 2021 for International Application No. PCT/EP2020/080569, from which the instant application is based, 9 pgs.

*Primary Examiner* — Patrick J. Lynch
(74) *Attorney, Agent, or Firm* — Fredrikson & Byron, P.A.

(57) ABSTRACT

A wearable protection device including at least one inflatable member designed to move between a rest condition in a deflated status and an operating condition in an inflated status, and an inflator device designed to be coupled to the at least one inflatable member for inflating said at least one inflatable member once the inflator device is triggered. The wearable protection device includes a safety device designed to signal an unsafe state of the wearable protection device if the inflator device is decoupled or not properly coupled to said at least one inflatable member.

22 Claims, 5 Drawing Sheets

(56) References Cited

U.S. PATENT DOCUMENTS

| | | | |
|---|---|---|---|
| 2003/0182040 A1 | 9/2003 | Davidson | |
| 2011/0267193 A1* | 11/2011 | Aronov | E05B 73/0017 |
| | | | 340/571 |
| 2014/0191588 A1* | 7/2014 | Stevens | G06F 1/1632 |
| | | | 307/125 |
| 2015/0128334 A1* | 5/2015 | Mazzarolo | A41D 13/018 |
| | | | 2/466 |
| 2015/0173433 A1* | 6/2015 | Mazzarolo | A41D 13/018 |
| | | | 2/463 |
| 2017/0202279 A1* | 7/2017 | Mazzarolo | B62J 27/20 |
| 2017/0224031 A1 | 8/2017 | Raanan | |
| 2017/0270814 A1* | 9/2017 | Chen | A63H 33/042 |
| 2019/0038100 A1* | 2/2019 | Lee | A47L 5/14 |
| 2019/0069612 A1* | 3/2019 | Hyde | H01H 35/14 |
| 2019/0223525 A1 | 7/2019 | Mazzarolo et al. | |
| 2021/0058105 A1* | 2/2021 | Landry | H04W 12/08 |

* cited by examiner

WEARABLE PROTECTION DEVICE

RELATED APPLICATIONS

This application is a 35 U.S.C. 371 national stage filing from International Application No. PCT/EP2020/080569, filed Oct. 30, 2020, which claims priority to Italian Application No. 102019000020298, filed Nov. 4, 2019, the teachings of which are incorporated herein by reference.

Field of the Invention

The present invention relates to a wearable protection device. In particular, the present invention relates to a wearable protection device which comprises an inflatable member.

More specifically, the present invention relates to a wearable protection device provided with an inflatable member, suitable for being used in all the fields where an effective protection against impacts and/or falls must be obtained. For example, the wearable protection device is suitable for being worn by motorcyclists, cyclists, skiers or during working activities.

For sake of clarity, in the present description reference will be made, in a not limiting way, to a wearable protection device suitable for being worn by a motorcyclist.

Background

Typically, the wearable protection device consists in a protection garment, like for example a jacket, a suit, a vest, a belt, which contains an inflatable member, suitable for moving from a rest condition, wherein it is in a deflated status, to an operating condition, wherein it is in an inflated status.

The inflatable member is in fluid communication with an inflation device, like for example a gas cartridge, which is adapted to introduce into the inflatable member a predefined quantity of an inflation fluid, like for example compressed gas, so as to inflate, and therefore expand, the inflatable member.

The releasing of the inflation fluid can be controlled by a mechanical or electronic system.

The gas cartridges usually consist in a cylindrical housing having a first end connected to an opening of the inflatable member and, in case of a system electronically activated, a second end connected to the control unit of the wearable device by means of a specific connector.

The connection of the gas cartridge to the inflatable member can be carried out by directly clamping an end of the cartridge inside the opening of the inflatable member. Alternatively, the end of the gas cartridge can be provided with an external thread suitable for being screwed inside a corresponding thread of a cap, arranged at the opening of the inflatable member.

Alternatively, the end of the gas cartridge can be connected to the inflatable member by means of a bayonet mount, wherein the male element is provided at the end of the gas cartridge and a female receptor is provided at a cap arranged at the opening of the inflatable member.

In the known devices, after having been inflated, the inflatable member can be reused, if it has not undergone damages, like tearings or punctures.

On the contrary, the gas cartridge needs to be replaced after every deployment with a new one.

However, the replacement of the gas cartridge is an operation which could be dangerous if not managed in the proper way.

As a matter of fact, in order to assure high performances in terms of pressure and deployment time, without increasing the dimensions of the gas cartridge, the latter usually contains a pyrotechnic charge.

In case of an airbag system electronically activated, the pyrotechnic charge is fired by means of an electronic impulse coming from the control unit; in case of airbag mechanically activated, the pyrotechnic charge boosts a mechanical firing pin.

Even if the manufacturers follow standard safety procedures to guarantee the safe manipulation of the gas cartridges, the possibility exists that the electronic or mechanical control of the cartridges may fail or that the user didn't handle the cartridge in an appropriate way during the manipulation and/or the change of the gas cartridge.

In order to avoid any safety problems to the final user, at now the replacement of the gas cartridges is handled by authorized centers having a specific training for handling pyrotechnical parts and for guaranteeing the correct connection between the gas cartridge and the inflatable member.

To replace the exhausted gas cartridge, in case of a system electronically activated, the electronic connector to the control unit firstly needs to be released from the gas cartridge and then the end of the gas cartridge connected to the inflatable member needs to be removed from the inflatable member.

However, both operations may cause an accidental triggering of the pyrotechnical charge of the gas cartridge with high risks for the operator.

At the same time, even if the gas cartridge is replaced in a safe manner, the protection of the user could be compromised.

As a matter of fact, a proper inflation of the inflatable member is prevented if the new gas cartridge is not correctly fixed to the inflatable member, with high risks for the final user.

In view of the above problems, if the inflatable member is activated during the use of the wearable protective device, the latter must be returned to an authorized center for carrying out the replacement of the gas cartridge.

However, the shipment of the wearable protective device is costly since the garment is bulky. Moreover, the user for at least a certain period of time, usually two or three weeks, is deprived of the additional protection offered by the inflatable wearable protection device, unless he/she has at his/her disposal a further inflatable protection garment, with the related not negligibly costs.

Brief Summaries of Objects of the Invention

The main object of the present invention is therefore to provide a wearable protection device with an inflatable member and configured to overcome or at least reduce the drawbacks above mentioned with reference to the known wearable airbag devices. More specifically, the main object of the present invention is to provide a wearable protection device with an inflatable member and configured to permit a safe and proper replacement of the gas cartridge without needing to return the wearable protection device to a customer service center after the deployment of the inflatable member.

Another object of the present invention is to provide a wearable protection device with an inflatable member and configured to allow the safer and proper replacement of the gas cartridge by person not having a specific technical training.

A further object of the present invention is to provide a wearable protection device with an inflatable member and configured not to permit the triggering of the inflatable member, in case the gas cartridge is not connected or not properly connected to the inflatable member.

Another object of the present invention is to provide a wearable protection device with an inflatable member and configured to provide a reliable feedback to the final user about the mutual positioning between the gas cartridge and the inflatable member.

Finally, an object of the present invention is to provide a wearable protection device with an inflatable member suitable for being used more than once, offering the same safety level in any subsequent activation.

These objects, and other objects that will better appear in the following of the present description, are achieved by a wearable protection device according to claim 1.

BRIEF DESCRIPTIONS OF THE DRAWINGS

The advantages and the characteristic features of the invention will appear more clearly from the following description of a preferred, but not exclusive, embodiment of the wearable protection device which refers to the accompanying figures in which.

DETAILED DESCRIPTION OF EMBODIMENTS OF THE INVENTION

Figure 1:
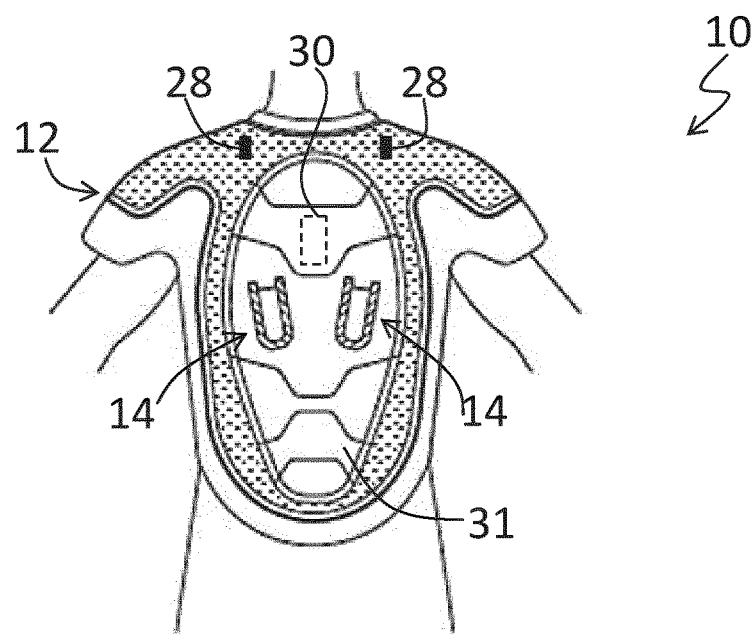
FIG. 1 shows, in schematic form, a partially sectioned rear view of a wearable protection device according to the present invention, worn by a user.
Figure 2:
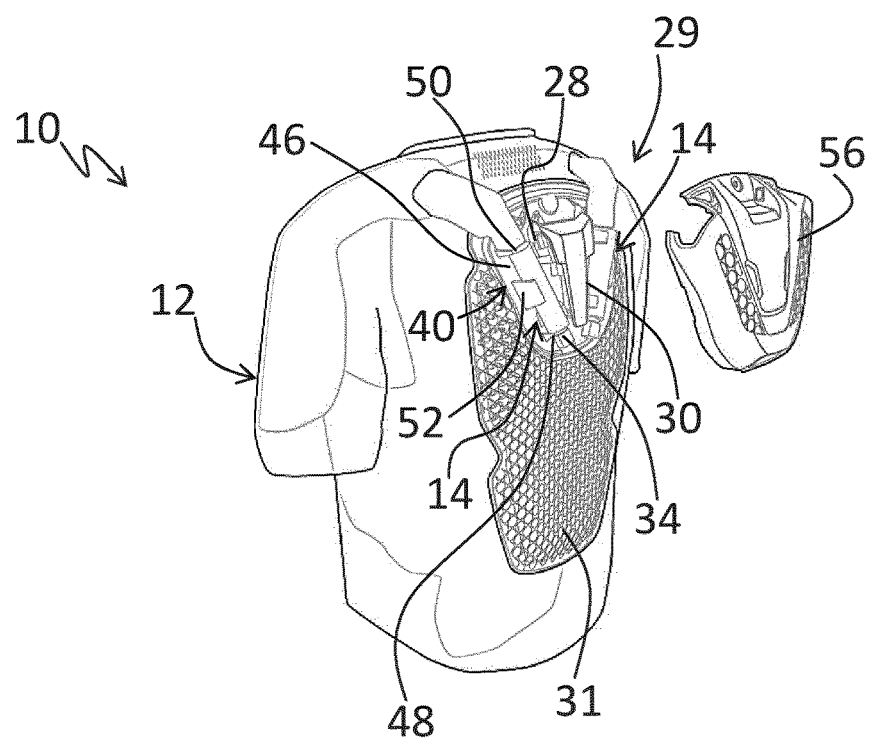
FIG. 2 shows, in schematic form, a partially exploded perspective view of a further embodiment of the wearable protection device according to the present invention.

With reference to FIGS. 1 and 2, an example of a wearable protection device, according to the present invention, is indicated in its whole by the reference 10.

The wearable protection device 10 can be a garment, like for example a jacket or a suit, or alternatively can be an undergarment suitable for being used in combination with an outer protection garment.

In a further embodiment, the wearable protection device 10 can be a harness designed to be worn on top or under a further garment.

The wearable protection device 10 is preferably designed for being worn by motorcyclists. Nevertheless, as it will appear more clearly from the following description, the wearable protection device 10 can also be advantageously used by cyclists or in other fields where an effective protection of the user's body must be obtained.

The wearable protection device 10 comprises at least one inflatable member 12. The inflatable member 12 is designed to move between a rest condition, wherein it is in a deflated status, and an operating condition, wherein it is in an inflated status. The inflatable member 12 is inflated with a fluid, like for example air or gas, so as to expand for protecting the wearer of the wearable protection device 10 against impacts, falls or slidings.

In the embodiment shown in FIG. 1, the wearable protection device 10 is provided with a single inflatable member 12 designed for protecting chest, back and shoulders of the user.

In the embodiment shown in FIG. 2, wherein the inflatable member 12 is shown in transparency for convenience, the inflatable member is designed to also cover the sides of the user.

However, the wearable protection device 10 can be provided with a single inflatable member 12 or a plurality of inflatable members suitable for covering different portions of the user's body.

Preferably the inflatable member 12 has a bag-like shape.

The wearable protection device 10 also comprises at least one inflator device 14 designed to be coupled to the inflatable member 12 for inflating the latter when the inflator device 14 is triggered.

Preferably the inflator device 14 is chosen from the group comprising pyrotechnic inflators, compressed gas inflators and hybrid inflators. As it is well known in the art, in pyrotechnic inflators a pyrotechnic charge is used to ignite the combustion of a gas generating material to provide inflation gas. Compressed gas inflators in turn use a minimal amount of pyrotechnic material to open a sealed chamber to release the inflation gas from a compressed state.

Hybrid inflators use a combination of combustion and compressed gas storage to provide the inflation gas needed to fill the inflatable member 12.

The inflator device 14 can comprise a plurality of inflation charges so as to be able to inflate the inflatable member 12 more than once so that the inflations of the inflatable member 12 take place in a chronological order.

In this case, the replacement of the inflator device 14 is carried out once all the inflation charges have been triggered.

As it is shown in FIGS. 3-7, the inflator device 14 is preferably in the form of a cylindrical gas cartridge having a connecting end 16 designed to be connected to the inflatable member 12. In detail, the connecting end 16 is preferably inserted and blocked in a gas tightly manner into an opening 18 of the inflatable member 12.

Figure 4:
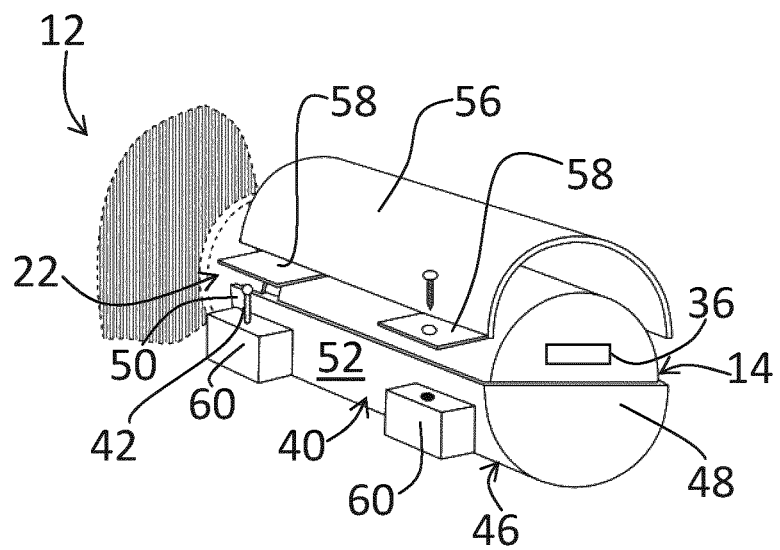
FIG. 4 is a figure similar to FIG. 3, but related to a different embodiment of the safety device.
Figure 5:
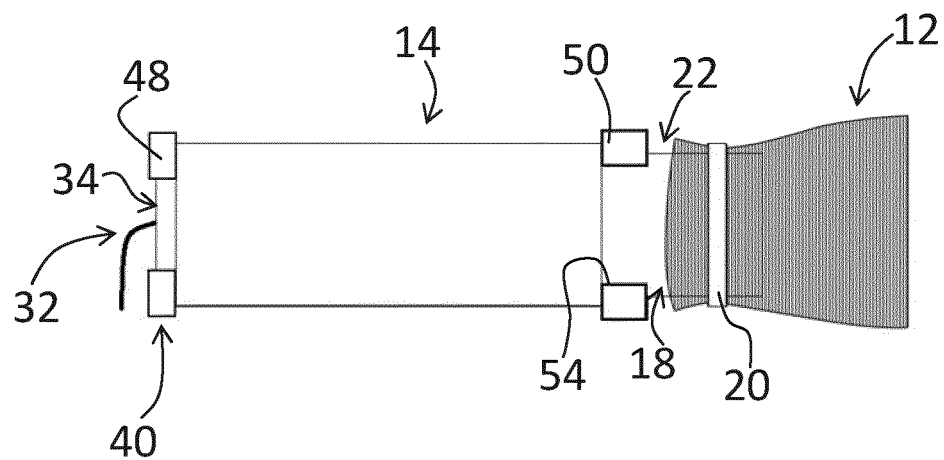
FIG. 5 shows, in schematic form, a top view of a further embodiment of the safety device of the wearable protection device according to the invention.
Figure 6:
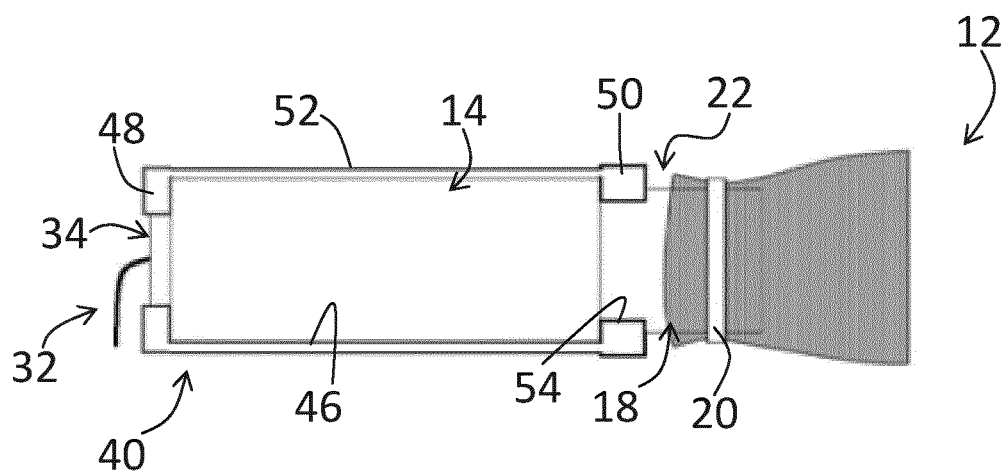
FIG. 6 is a figure similar to FIG. 5, but related to a different embodiment of the safety device.
Figure 5A:
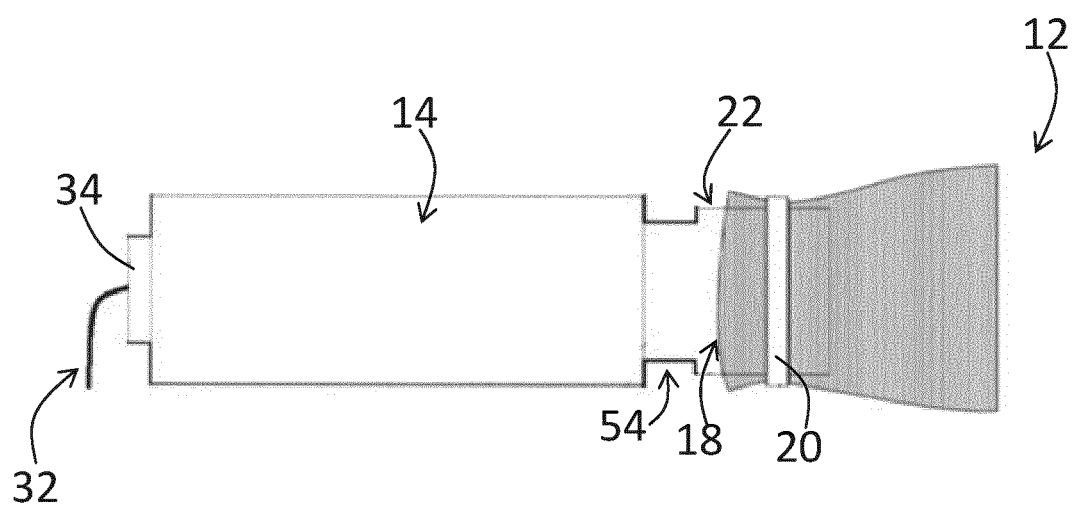
FIG. 5A is a figure similar to FIG. 5, wherein for sake of clarity the safety device has been removed.

As it is known in the art, the connecting end 16 of the gas cartridge 14 can be clamped inside the opening 18 by means of a holding ring 20 (see for example FIGS. 5 and 6). Alternatively, the connecting end 16 of the gas cartridge 14 can be inserted inside a corresponding cap 22 fastened at the opening 18 of the inflatable member 12 (see for example FIGS. 3 and 4).

The connecting end 16 of the gas cartridge 14 can be inserted by pressure into the cap 22. Alternatively, the connecting end 16 of the gas cartridge 14 can be provided with an external thread 24 suitable for being screwed into a corresponding internal thread 26 provided inside the cap 22.

The inflator device 14 can be triggered by means of an electronic or mechanical mechanism.

In case of an electronically activation, the wearable protection device 10 comprises at least one sensor 28 designed to detect forces acting on the wearable protection device 10.

In the embodiment of FIG. 1, two sensors 28 are, for example, applied at the shoulder portion of the wearable protection device 10. In the embodiment of FIG. 2, one or more sensors 28 are applied, for example, in a housing 29 positioned at the upper back portion of the wearable protection device 10. The housing 29 is shown in detail in FIGS. 7 and 8.

In a further embodiment, not shown in the figures, at least one sensor can be directly applied on the wearable protection device and at least one sensor can be positioned inside a protection applied on the wearable protection device.

Preferably the wearable protection device 10 comprises at least one accelerometer, designed to detect the accelerations acting on the wearable protection device, and/or at least one gyroscope, designed to detect movements and orientation of the wearable protection device.

The wearable protection device 10 can further comprise a control unit 30 designed to process the data detected by the sensor 28 and to send a triggering signal to the inflator device 14, when a crash situation is identified.

As a "crash situation" should be intended a situation wherein the wearable protective device undergoes a sudden acceleration/deceleration and/or a sudden variation in its orientation and in its angular velocity.

In particular, when the wearer of the wearable protective device is on a vehicle, like for example a motorcycle, a sudden acceleration or deceleration undergone by the wearable protection device can identify that the motorcycle has hit an obstacle or that the wearer has lost the control of the motorcycle being thrown from the saddle.

The control unit 30 is preferably housed in a protected zone of the wearable protection device 10, like for example a back protector 31 applied to the wearable protection device (see for example FIG. 1) or the housing 29 also used for housing the sensor 28 and the gas cartridge 14.

The control unit 30 is designed to process at regular time intervals (for example 1 ms) the data received from the sensor 28 so as to obtain an information about the forces acting on the wearable protection device 10.

If the control unit 30 detects, on the basis of an algorithm implemented therein, that a crash situation is occurring, a triggering signal is sent from the control unit 30 to the inflator device 14 so that the inflatable member 12 can be inflated.

In case of a mechanical activation of the inflator device 14, the latter can be triggered by using an activation cable or tether connecting the wearable protection device to the motorcycle.

The activation cable has a first end connected to the motorcycle and a second end fixed to a triggering device, designed to trigger a firing pin, which in turn is configured to activate the inflator device.

If a separation of the wearer from the motorcycle occurs, as it is typically caused by a fall and/or an impact, the activation cable or the tether by means of the triggering device triggers the firing pin causing the inflator's deployment.

In case of an electronic activation of the inflatable member 12, the inflator device 14 is electronically connected to the control unit 30.

In detail, the inflator device 14 is connected to the control unit 30 by means of a cable 32 having at its end an electronic connector 34 (see FIGS. 2, 3, 5, 5A, 6). The electronic connector 34 is designed to be coupled to a corresponding slot 36 provided in the inflator device 14 (see FIG. 4).

Preferably, the slot 36 is positioned at the opposite end with respect to the connecting end 16 of the gas cartridge 14.

If the electronic connector 34 is released from the slot 36 of the gas cartridge 14, the latter cannot be triggered and thus no inflation of the inflatable member 12 is possible. According to the invention, the wearable protection device 10 comprises a safety device 40 designed to signal an unsafe state of the wearable protection device 10 if the inflator device 14 is decoupled or not properly coupled to the inflatable member 12. As "unsafe state" should be intended a state of the wearable protection device 10 which does not permit a proper inflation of the inflatable member 12 or represents a potential hazard for the wearer.

As it will appear clearly from the following description the safety device 40 is able to signal when the inflator device 14 is not properly connected to the inflatable member 12 so as to avoid malfunctioning of the wearable protection device 10.

For example, the inflator device 14 is not properly connected to the inflatable member 12 if the connection is not gas tight. Such an occurrence can happen, for example, if the connecting end 16 of the inflator device 14 is spaced apart from the corresponding receiving opening/seat 18 provided in the inflatable member 12.

Similarly, if the connecting end 16 of the gas cartridge 14 is provided with an external thread 26, the gas cartridge 14 is not properly fixed to the cap 22 of the inflatable member 12, if it is not screwed in the cap 22 until the gas cartridge 14 abuts against the cap 22 of the inflatable member 12.

Moreover, the safety device 40 is able to assist who carries out the replacement of the inflator device 14, once exhausted, so as to permit a safe handling of the inflator device 14, limiting the risk that the inflator device 14, and in particular the pyrotechnic charge, is activated by mistake.

In a first embodiment, in case the inflatable member 12 is designed to be electronically activated by means of the control unit 30, the safety device 40 comprises a safety or positioning sensor 42, connected to the control unit 30, and designed to automatically switch off the control unit 30 or not to permit the switching on of the control unit 30 if the wearable protection device 10 is in an unsafe state.

In this way there is no possibility that the inflation device 14 is triggered by the control unit 30, so as to avoid the risk of an improper inflation.

The safety sensor 42 can be connected to a signaling device of the wearable protection device 10. Such a signaling device can be applied at the outer surface of the wearable protection device.

If the wearable protection device is in an unsafe state the safety device can provide a visual signal to the wearer, for example by switching off the signaling device, or it can provide an audible alarm.

In a first embodiment, the safety device 40 can comprise a positioning sensor 42 designed to signal the unsafe state of the wearable protection device 10 if a distance between reference marks provided respectively on the inflator device 14 and on the inflatable member 12 exceeds a predetermined distance value, which is set up by assuming that the inflator device is properly connected to the inflatable member. When the detected distance is greater than the reference value it means that the inflator device is not properly connected to the inflatable member.

Figure 3:
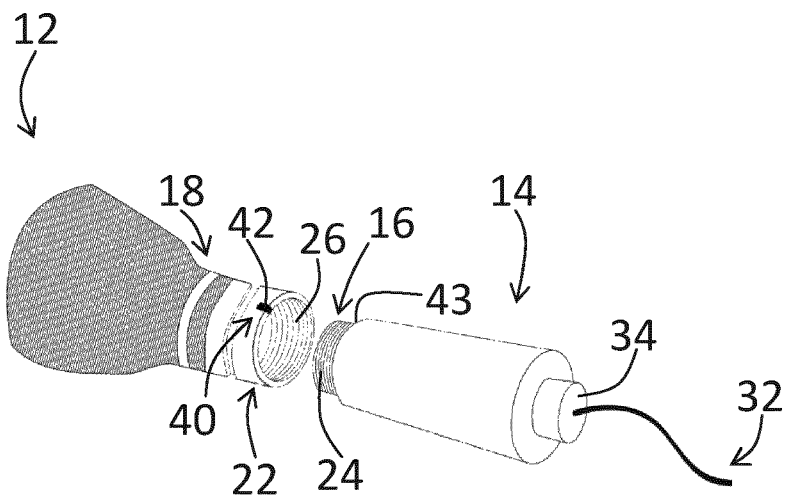
FIG. 3 shows, in schematic form, a perspective view of a possible embodiment of a safety device of the wearable protection device according to the invention.

In particular, as shown in FIG. 3, a positioning sensor 42, connected to the control unit 30, can be applied in proximity of the opening 18 of the inflatable member 12 to which the inflator device 14 is connected. In this way, the positioning sensor 42 is able to detect the presence of the inflator device 14 and/or the contact with a facing surface 43 of the inflator device 14.

According to the embodiment of FIG. 3, the positioning sensor 42 is preferably applied at the rim of the cap 22 fastened to the inflatable member 12, so as to be able to detect the presence and/or the contact with the facing surface 43 of the gas cartridge 14. Such a facing surface 43 is designed to be placed in close proximity or to abut against the rim of the cap 22 if the gas cartridge 14 is properly connected to the inflatable member 12. If the gas cartridge 14 is not properly connected to the inflatable member 12, the positioning sensor 42 does not detect the presence of the gas cartridge 14 or the contact between the facing surfaces of rim and gas cartridge and thus it automatically switches off the control unit 30 or keeps the control unit 30 in a switched off status.

Alternatively the positioning sensor 42 can be applied at the connecting end 16 of the inflator device 14.

The positioning sensor can be an electronic switch, like for example a contact sensor, or a proximity sensor, like for example a Hall effect sensor.

In case of an inflatable member mechanically activated, the positioning sensor 42 can be connected to a signaling device able to signal to the wearer that the gas cartridge is not properly fixed to the inflatable member.

In an alternative embodiment the positioning sensor 42 can be a mechanical switch preferably applied at the rim of the cap 22 and suitable to signal an unsafe state of the wearable protection device when it is not pressed by a facing surface 43 of the gas cartridge 14.

Figure 7:
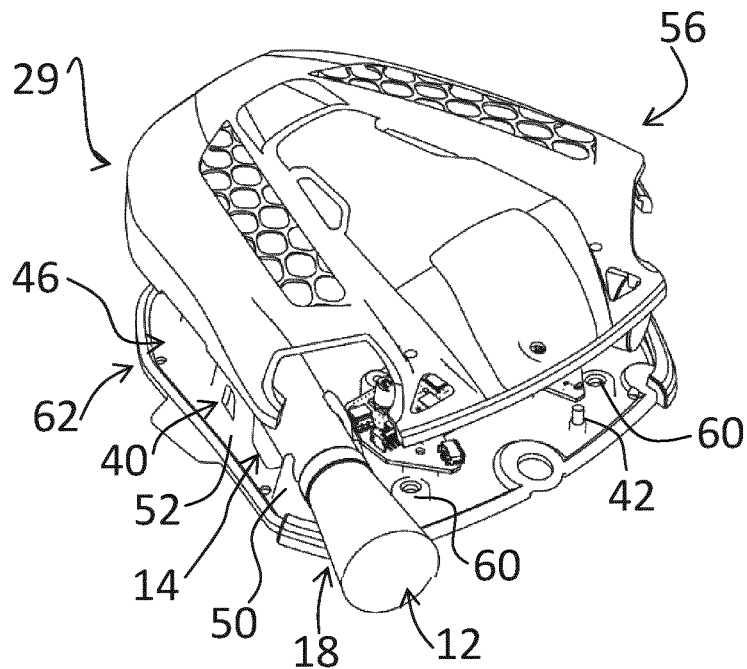
FIG. 7 shows, in schematic form, an exploded perspective view of a housing of the wearable protection device inside which a safety device according to the invention is positioned.

In an alternative embodiment, the inflator device 14 can be designed to be inserted in a holding seat 46 (see FIGS. 4, 6 and 7). The holding seat 46 can be fastened to an inner or an outer surface of the wearable protection device 10.

Preferably, the holding seat 46 is provided in the housing 29 positioned at the upper portion of the back (see FIG. 2).

Advantageously, in this embodiment, the safety device 40 comprises a mechanical device configured to allow the insertion of the inflator device 14 inside the holding seat 46 only if the inflator device 14 is properly connected to the inflatable member 12.

In this case, if the wearable protection device 10 is in an unsafe status, namely the gas cartridge 14 is not properly connected to the inflatable member 12, the safety device 40 is able to provide the wearer with a direct visual information, since the wearer will see that the gas cartridge 14 is at least partially spaced apart from the holding seat 46 or not inserted therein.

Such a safety device 40 can be used both in wearable protection device 10 electronically activated and in wearable protection device mechanically activated. As shown in FIG. 4, the safety device 40 can comprise at least one abutment surface 48, 50, 52 designed to define in the holding seat 46 a geometry complementary to the assembly formed by the inflator device 14 and the cap 22 of the inflatable member 12, once the connecting end 16 of the inflator device 14 is properly inserted inside the cap 22.

Preferably, in this embodiment the safety device 40 comprises a front abutment surface 50 and a rear abutment surface 48. The front abutment surface 50, which preferably has a recess on which the cap 22 can be laid, is designed to be positioned in proximity of the junction between cap and connecting end, while the rear abutment surface 48 is opposite to the front abutment surface 50.

Advantageously, the distance between the front abutment surface 50 and the rear abutment surface 48 is set so as to coincide with the length of the assembly formed by the inflator device 14 and the cap 22 once the connecting end 16 is properly inserted inside the cap 22 (see FIG. 4).

Alternatively, the distance between the front abutment surface 50 and the rear abutment surface 48 is set so that the front abutment surface 50 can engage corresponding notches 54 provided in the cap 22 (see FIGS. 5, 5A and 6) or in the gas cartridge 14 only if the connecting end 16 is properly inserted inside the cap 22 and the rear end of the gas cartridge 14 is abutting against the rear abutment surface 48.

In a further embodiment, also the rear abutment surface 48 can be shaped so as to be able to engage corresponding notches provided at the rear end of the gas cartridge only if the gas cartridge is properly connected to the inflatable member.

Alternatively the rear abutment surface 48 can be shaped so as to be complementary to the electronic connector 34 by means of which the gas cartridge 14 is connected to the control unit 30.

If the connecting end 16 of the gas cartridge 14 is not properly inserted inside the cap 22, the gas cartridge cannot be inserted inside the holding seat 46 since the rear portion of the gas cartridge 14 will hit the rear abutment surface 48 or the front and rear abutment surfaces 48, 50 will not be able to match the reference notches 54.

The wearer has thus an immediate feedback about the mutual positioning between the gas cartridge 14 and the inflatable member 12 and he is induced to act on the gas cartridge 14 so as to properly connect it to the inflatable member 12.

At the same time, the mechanical safety device 40 is also useful to block the gas cartridge 14 in the proper position with respect to the inflatable member 12 once it is connected to it. As a matter of fact, the front and rear abutment surfaces 48, 50, preferably in combination with side surfaces 52 extending from the front abutment surface 50 to the rear abutment surface 48, allow to firmly detain the gas cartridge 14 inside its seat 46, so as to avoid that following vibrations or shocks occurring during the use of the wearable protection device the gas cartridge 14 can move from its proper position.

Advantageously, a safety sensor, connected to the control unit 30, can be applied on an inner surface of the holding seat 46, namely on a surface which is designed to be in contact with the inflator device 14 when the inflator device is inserted in the holding seat 46.

When the inflator device 14 is removed from its holding seat 46, such a sensor is able to switch off the control unit or to keep the control unit switched off, until an inflator device is properly positioned inside the holding seat 46.

For example, the safety sensor can be a mechanical switch or a pressure sensor.

In a further embodiment, the wearable protection device can comprise two holding seats 46 each designed for housing one inflator device 14; said holding seats 46 being both provided with a safety sensor connected to the control unit 30 on their inner surface.

In this case, the control unit 30 will be switched off or will be kept switched off if one of the inflator devices is not properly inserted inside its holding seat.

Figure 8:
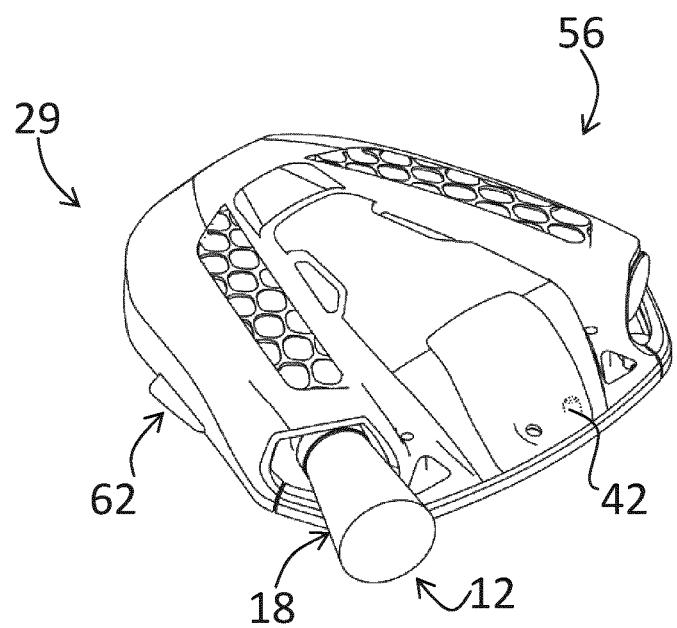
FIG. 8 is a figure similar to FIG. 7, wherein the housing is in a closed configuration.

Advantageously, the holding seat 46 can comprise a cover 56 suitable for protecting the gas cartridge 14 (see FIGS. 4, 7 and 8). The cover 56 can be provided with first fastening means 58 designed to be coupled with corresponding second fastening means 60 of the holding seat 46 so as to permit the fastening of the cover 56 to the holding seat 46.

First and second fastening means 58, 60 are designed to be matched to each other only if the safety device 40 permits the insertion of the inflator device 14 inside the holding seat 46.

As a matter of fact, if the gas cartridge 14 cannot be inserted inside the holding seat 46, the cover 56 cannot be correctly fixed to the holding seat 46, since the gas cartridge 14 projects from the holding seat 46.

The wearer in this case clearly understands that the wearable protection device is in an unsafe state being the cover 56 spaced apart from the holding seat 46.

Advantageously, also in this embodiment the safety device 40 can be designed to switch off the control unit 30 or to keep the control unit 30 switched off if the wearable protection device is in an unsafe state.

The safety device 40 can comprise a safety or contact sensor 42, connected to the control unit 30, which can be positioned on a top edge of the holding seat 46 or on a bottom edge of the cover 56 (see FIG. 4). Such a sensor 42 is designed to switch on the control unit 30 once the cover 56 is properly fixed to the holding seat 46 and to switch off or to keep the control unit switched off when the cover 56 is removed from the seat.

A not properly fastening of the cover 56 to the holding seat 46 signals an unsafe state of the wearable protection device since the inflator device 14 is not properly coupled to the inflatable member 12.

Therefore, the safety device 40, in case the gas cartridge 14 must be replaced, is able to re-activate the control unit 30 only if the gas cartridge 14 is correctly positioned inside its holding seat 46 and/or the cover 56 is properly fastened to the holding seat 46. Advantageously the wearable protection device 10 can be provided with two holding seats 46, each seat being suitable for housing a corresponding gas cartridge 14. These holding seats 46 can be arranged on a supporting plate 62, suitable for being fixed to the outer surface of the wearable protection device 10.

Both seats can be provided with the above mentioned safety device 40 and with a corresponding cover 56.

Advantageously, in case both safety devices 40 comprise a contact sensor 42 positioned on the cover 56 or on the seat 46, the control unit 30 will be switched off or it will be kept switched off, if one of the gas cartridges 14 is not properly inserted inside its holding seat 46, so as not to permit the correct positioning of the cover over the holding seat.

Alternatively, the supporting plate 62 can have a single cover 56 suitable for covering both holding seats 46. A contact sensor 42 can be applied at the bottom rim of the cover 56 or at a top surface of the supporting plate 62.

Also in this embodiment, the cover 56 can be properly fixed to the supporting plate 62, only if both gas cartridges are properly inserted inside their holding seats 46.

A proper connection between cover and supporting plate causes the pressing of the contact sensor 42 which emits a corresponding signal to the control unit.

At this point it is clear how the predefined objects may be achieved with the wearable protection device according to the invention.

The safety device allows a safe and proper replacement of the gas cartridge without needing to return the wearable protection device to a customer service. As a matter of fact, the safety device offers a reliable feedback about the connection between the gas cartridge and the inflatable member, so that also a final user not having a specific training is able to understand whether the gas cartridge, used in replacement of an exhausted gas cartridge, has been properly connected to the inflatable member.

Moreover, the safety device offers a protection against possible hazards occurring during the replacement of the gas cartridge since it is able to switch off or to keep in a switched off status the control unit until the gas cartridge is not connected or not properly connected to the inflatable member, so as to avoid that the pyrotechnic charge of the gas cartridge can be inadvertently activated.

With regard to the embodiments of the wearable protective device described above, the person skilled in the art may, in order to satisfy specific requirements, make modifications to and/or replace elements described with equivalent elements, without thereby departing from the scope of the accompanying claims.

The invention claimed is:

1. A wearable protection device comprising:
   at least one inflatable member designed to move between a rest condition in a deflated status and an operating condition in an inflated status;
   an inflator device designed to be coupled to the at least one inflatable member for inflating said at least one inflatable member once the inflator device is triggered; and
   a safety device designed to signal an unsafe state of the wearable protection device if the inflator device is decoupled or not properly coupled to said at least one inflatable member.

2. The wearable protection device according to claim 1, further comprising:
   at least one sensor designed to detect forces acting on the wearable protective device; and
   a control unit designed to process the data detected by the at least one sensor and to send a triggering signal to the inflator device when a crash situation is identified,
   wherein the safety device comprises a safety sensor connected to the control unit and designed to automatically switch off the control unit or not to permit the switching on of the control unit if the wearable protection device is in an unsafe state if a distance between reference marks provided respectively on the inflator device and on said at least one inflatable member exceeds a predetermined value.

3. The wearable protection device according to claim 1, characterized in that the safety device comprises a safety sensor designed to signal an unsafe state of the wearable protection device if a distance between reference marks provided respectively on the inflator device and on said at least one inflatable member exceeds a predetermined value.

4. The wearable protection device according to claim 2, characterized in that the safety sensor is applied in proximity of an opening of the inflatable member to which the inflator device is connected, the safety sensor being able to detect one or more of presence of the inflator device and contact with a facing surface of the inflator device.

5. The wearable protection device according to claim 2, characterized in that the inflator device is provided with a connecting end designed to be inserted inside a corresponding cap fastened at an opening of said at least one inflatable member, the safety sensor being applied at the connecting end of the inflator device or at the cap fastened to the inflatable member.

6. The wearable protection device according to claim 2, characterized in that the safety sensor is an electronic or mechanical switch or a proximity sensor.

7. The wearable protection device according to claim 1, characterized in that the inflator device is insertable in a holding seat, the safety device configured to allow insertion of the inflator device inside said holding seat when the inflator device is connected to said at least one inflatable member.

8. The wearable protection device according to claim 7, characterized in that the inflator device is provided with a connecting end designed to be inserted inside a corresponding cap arranged at an opening of said at least one inflatable member, the safety device comprising at least one abutment surface designed to define in the holding seat a geometry complementary to the assembly formed by the inflator device and the cap when the connecting end is inserted inside the cap.

9. The wearable protection device according to claim 8, characterized in that the safety device comprises a front abutment surface and a rear abutment surface, a distance between the front abutment surface and the rear abutment surface coinciding with a length of assembly formed by the inflator device and the cap when the connecting end is inserted inside the cap.

10. The wearable protection device according to claim 8, characterized in that the safety device comprises a front abutment surface and a rear abutment surface, a distance between the front abutment surface and the rear abutment surface being set so that the front abutment surface engages corresponding notches provided in the cap or in the inflator device, provided the connecting end is inserted inside the cap and a rear end of the inflator device is abutting against the rear abutment surface.

11. The wearable protection device according to claim 2, characterized in that the safety device comprises a rear abutment surface shaped so as to be complementary to an electronic connector by means of which the inflator device is connected to the control unit.

12. The wearable protection device according to claim 7, characterized in that the holding seat comprises a cover suitable for protecting the inflator device, the cover being provided with first fastening means designed to be coupled with corresponding second fastening means of the holding seat so as to permit fastening of the cover to the holding seat, the first and the second fastening means being designed to be matched, provided the safety device permits the insertion of the inflator device inside the holding seat.

13. The wearable protection device according to claim 12, further comprising:
at least one sensor designed to detect forces acting on the wearable protective device; and
a control unit designed to process the data detected by the at least one sensor and to send a triggering signal to the inflator device when a crash situation is identified, wherein the safety device comprises a safety sensor connected to the control unit and designed to automatically switch off the control unit or not to permit the switching on of the control unit if the wearable protection device is in an unsafe state if a distance between reference marks provided respectively on the inflator device and on said at least one inflatable member exceeds a predetermined value;
characterized in that the safety sensor is positioned on a top edge of the holding seat or on a bottom edge of the cover.

14. The wearable protection device according to claim 13, characterized by comprising two holding seats, each of the holding seats being suitable for housing a corresponding inflator device.

15. The wearable protection device according to claim 14, characterized in that said holding seats are arranged on a supporting plate designed to be fixed to an outer surface of the wearable protection device, said supporting plate having one cover suitable for covering both of said two holding seats.

16. The wearable protection device according to claim 14, characterized in that each holding seat comprises a cover and a safety sensor, each safety sensor being designed to automatically switch off the control unit or prevent switching on of the control unit when any one inflator device is not inserted inside its corresponding holding seat so as to permit positioning of its corresponding cover.

17. The wearable protection device according to claim 2, wherein the inflator device is insertable in a holding seat, the safety device configured to allow insertion of the inflator device inside said holding seat when the inflator device is connected to said at least one inflatable member, characterized in that the safety sensor is positioned on an inner surface of the holding seat, said inner surface being designed to be in contact with the inflator device when the inflator device is inserted in the holding seat.

18. The wearable protection device according to claim 17, characterized by comprising two holding seats, each of the holding seats being suitable for housing a corresponding inflator device.

19. The wearable protection device according to claim 2, characterized in that the inflator device is designed to be inserted in a holding seat which comprises a cover suitable for protecting the inflator device, the safety sensor being designed to switch on the control unit when the cover is fixed to the holding seat and to switch off the control unit when the cover is removed from the holding seat.

20. The wearable protection device according to claim 8, characterized in that the safety device comprises a rear abutment surface shaped so as to be complementary to an electronic connector by means of which the inflator device is connected to the control unit.

21. The wearable protection device according to claim 12, characterized in that a safety sensor is positioned on a top edge of the holding seat or on a bottom edge of the cover.

22. The wearable protection device according to claim 7, characterized in that a safety sensor is positioned on an inner surface of the holding seat, said inner surface being designed to be in contact with the inflator device when the inflator device is inserted in the holding seat.

* * * * *